United States Patent
Vauchel et al.

(10) Patent No.: US 9,670,798 B2
(45) Date of Patent: Jun. 6, 2017

(54) TURBOJET ENGINE NACELLE WITH VARIABLE VENTILATION OUTLET CROSS SECTION

(71) Applicant: AIRCELLE, Gonfreiville l'Orcher (FR)

(72) Inventors: Guy Bernard Vauchel, Harfleur (FR); Laurence Lemains, St. Laurent de Brevedent (FR)

(73) Assignee: AIRCELLE, Gonfrieville l'Orcher (FR)

( * ) Notice: Subject to any disclaimer, the term of this patent is extended or adjusted under 35 U.S.C. 154(b) by 1003 days.

(21) Appl. No.: 13/870,369

(22) Filed: Apr. 25, 2013

(65) Prior Publication Data

US 2013/0236294 A1    Sep. 12, 2013

Related U.S. Application Data

(63) Continuation of application No. PCT/FR2011/052297, filed on Oct. 3, 2011.

(30) Foreign Application Priority Data

Oct. 25, 2010  (FR) ..................... 10 58712

(51) Int. Cl.
F02K 1/46     (2006.01)
F01D 25/24    (2006.01)
(Continued)

(52) U.S. Cl.
CPC ............ *F01D 25/24* (2013.01); *B64D 29/00* (2013.01); *B64D 33/04* (2013.01); *F02K 1/383* (2013.01); *F02K 1/46* (2013.01); *F02K 1/72* (2013.01)

(58) Field of Classification Search
CPC . F01D 25/24; F02K 1/46; F02K 1/383; F02K 1/72; B64D 29/00; B64D 33/04
(Continued)

(56) References Cited

U.S. PATENT DOCUMENTS 3,003,311 A * 10/1961 Hall ..................... F02K 1/1207
                                                                 239/127.1
3,391,869 A *  7/1968 Glass .................... F02K 1/08
                                                                 239/127.3
(Continued)

FOREIGN PATENT DOCUMENTS

FR    2890696        3/2007
FR    2890696 A1     3/2007
(Continued)

OTHER PUBLICATIONS

International Search Report of PCT/FR2011/052297 mailed Dec. 6, 2011.

*Primary Examiner* — Ted Kim
(74) *Attorney, Agent, or Firm* — Burris Law, PLLC

(57) ABSTRACT

A turbojet engine nacelle includes a rear section having an internal structure. The internal structure surrounds a rear part of an engine compartment and delimits, with an ejection jet pipe, an outlet cross section for the ventilation of the engine compartment. The engine nacelle includes a moving element associated with a corresponding controller. The moving element is able to move between a withdrawn position in which the outlet cross section for ventilation is at a maximum and an engaged position in which the moving element partially reduces the outlet cross section for ventilation by comparison with the retracted position. The controller is capable of moving the moving element between the retracted and engaged positions.

10 Claims, 4 Drawing Sheets

Figure 1:
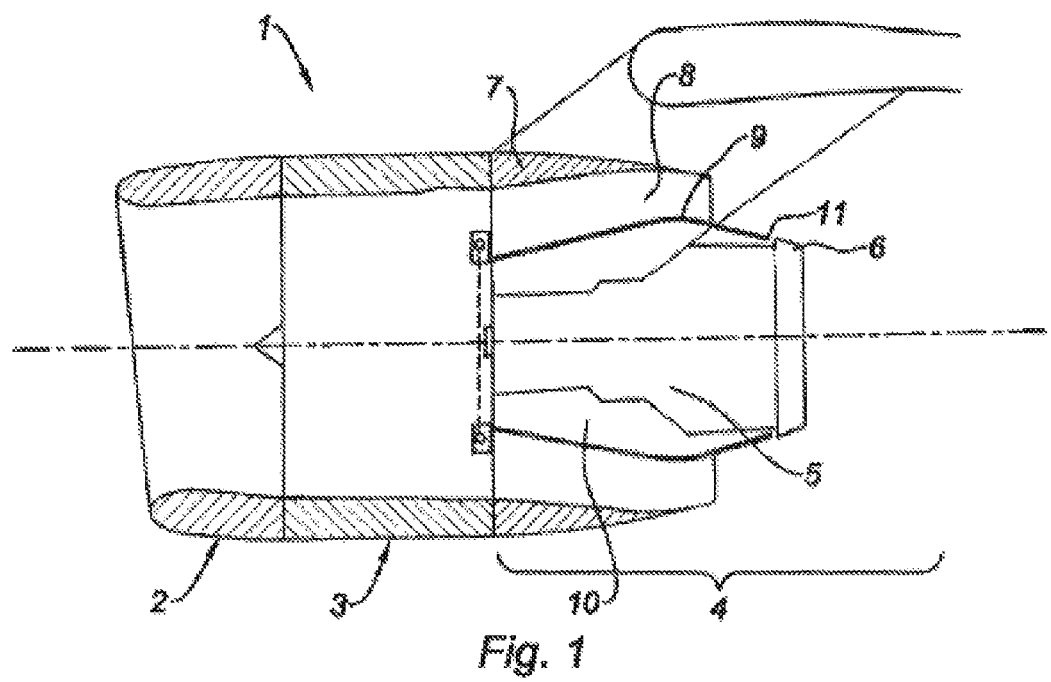

(51) Int. Cl.
  *B64D 29/00* (2006.01)
  *B64D 33/04* (2006.01)
  *F02K 1/38* (2006.01)
  *F02K 1/72* (2006.01)

(58) Field of Classification Search
  USPC .................................................. 60/266, 39.83
  See application file for complete search history.

(56) References Cited

U.S. PATENT DOCUMENTS

| | | | | |
|---|---|---|---|---|
| 3,477,230 | A * | 11/1969 | Bauger | F02K 1/1207 60/224 |
| 4,825,644 | A * | 5/1989 | Bubello | B64D 29/00 60/200.1 |
| 5,351,476 | A * | 10/1994 | Laborie | B64D 33/08 60/269 |
| 5,704,207 | A | 1/1998 | Jensen et al. | |
| 2003/0126856 | A1 * | 7/2003 | Lair | F02K 1/06 60/262 |
| 2007/0245739 | A1 * | 10/2007 | Stretton | F01D 17/105 60/728 |
| 2011/0214747 | A1 * | 9/2011 | Le Docte | B64D 29/06 137/15.1 |

FOREIGN PATENT DOCUMENTS

| | | |
|---|---|---|
| FR | 2896276 | 7/2007 |
| FR | 2920146 | 2/2009 |
| GB | 2435076 | 8/2007 |
| GB | 2435076 A | 8/2007 |
| RU | 2379536 | 1/2010 |
| RU | 2509687 | 3/2014 |
| WO | 2009/024660 | 2/2009 |
| WO | 2009/024660 A1 | 2/2009 |

\* cited by examiner

TURBOJET ENGINE NACELLE WITH VARIABLE VENTILATION OUTLET CROSS SECTION

CROSS-REFERENCE TO RELATED APPLICATIONS

This application is a continuation of International Application No. PCT/FR2011/052297 filed on Oct. 3, 2011, which claims the benefit of FR 10/58712, filed on Oct. 25, 2010. The disclosures of the above applications are incorporated herein by reference.

FIELD

The present disclosure relates to a turbojet engine nacelle for an aircraft.

BACKGROUND

The statements in this section merely provide background information related to the present disclosure and may not constitute prior art.

An aircraft is moved by several turbojet engines each housed in a nacelle also housing a set of related actuating devices connected to its operation and performing various functions, when the turbojet engine is operating or stopped. These related actuating devices may in particular comprise a mechanical thrust reverser actuating system.

A nacelle generally has a tubular structure including an air intake in front of the turbojet engine, a middle section designed to surround a fan of the turbojet engine, a rear section housing thrust reverser means and designed to surround the combustion chamber of the turbojet engine, and generally ends with a jet nozzle whereof the outlet is situated downstream of the turbojet engine (so-called primary nozzle).

Modern nacelles are often designed to house a dual flow turbojet engine capable of generating, by means of the rotating fan blades, a hot air flow (also called primary flow) coming from the combustion chamber of the turbojet engine.

A nacelle generally includes an outer structure, called outer fixed structure (OFS), that defines, with a concentric inner structure of the rear section, called inner fixed structure (IFS), surrounding the structure of the turbojet engine strictly speaking behind the fan, an annular flow channel, also called secondary tunnel, aiming to channel a flow of cold air, called secondary flow, that circulates outside the turbojet engine.

Around the turbojet engine, the inner structure delimits a compartment and ventilation areas, the primary purpose of which is to refresh the air circulating between the IFS and the engine.

The inner structure and the jet nozzle delimit an outlet cross-section of the fan of the engine compartment.

Several cool air sources (taken from the secondary flow) supply the ventilation compartment, circulate along the turbojet engine, where they heat up before being discharged through the ventilation outlet.

In general, the ventilation inlet and outlet cross-sections are sized so as to ensure acceptable ventilation and pressure in the ventilation compartment along the turbojet engine.

Document WO 2009/024660 describes such a system for regulating the ventilation air and the pressure in the ventilation compartment. The described system also makes it possible to accommodate certain deformations of the turbojet engine during flight.

More specifically, document WO 2009/024660 describes a turbojet engine nacelle, comprising a rear section having an inner structure designed to surround a rear part of an engine compartment and to delimit, with a jet nozzle, a calibrated outlet cross-section of the ventilation of the engine compartment, using separating means arranged in the outlet cross-section, characterized in that the separating means can be broken down into rigid separating means designed to ensure constant separation, and compensating means designed so as to be able to adapt to the relative movements of the turbojet engine with respect to the nacelle.

It should, however, be noted that the turbojet engine is equipped with high pressure air discharge valves allowing it to regulate its performance. Generally, these discharge valves are situated inside the inner structure (IFS) and emerge inside the ventilation compartment.

Thus, in the case where one or more valves discharged in that ventilation compartment for certain flight cases, a major overpressure results that must be absorbed and regulated.

Another case of accidental overpressure may also be a burst duct incident of the turbojet engine.

Furthermore, these overpressures cause irregular loads of the inner structure that work in fatigue. It may also result in deformations of said inner structure and, consequently, a disruption of the flow of the air flow to the outside of the nacelle amounting to losses in aerodynamic efficiency.

It has appeared that the current solutions do not account for these discharge valves, and there is therefore a need for a solution making it possible to better account for these additional constraints.

More specifically, the current solutions do not allow active management of the ventilation outlet.

SUMMARY

One aspect of the present disclosure is to provide a system making it possible to adapt the ventilation outlet to the maximum possible flight and pressure scenarios.

To that end, the present disclosure relates to a turbojet engine nacelle comprising a rear section having an inner structure, designed to surround a rear part of an engine compartment and to delimit, with a jet nozzle, an outlet cross-section of the ventilation of the engine compartment, characterized in that it comprises at least one moving element associated with at least one corresponding control means, said moving element being movable between a retracted position in which the ventilation outlet cross-section is maximal, and an engaged position in which the moving element at least partially reduces the ventilation outlet cross-section relative to the retracted position, said control means being able to move the moving element between the retracted and engaged positions.

Thus, by providing a moving element whereof the position is controllable, the ventilation outlet cross-section can be adjusted precisely and can easily be adapted to all flight and incident cases that may cause a pressure variation in the ventilation compartment of the turbojet engine.

Advantageously, the moving element can be moved into at least one intermediate position between its retracted and engaged positions. This is a discrete movement of the moving element.

Also advantageously, the moving element can be moved continuously between its retracted and engaged positions.

In another form, the moving element is mounted translatably. According to a first alternative aspect of the present disclosure, the moving element is translatable along a substantially longitudinal axis of the nacelle.

According to a second alternative aspect, the moving element is translatable in a substantially radial direction of the nacelle.

Alternatively, the moving element is rotatably mounted around a pivot axis. This may in particular be a check valve.

According to one form, the moving element is movably mounted on an exhaust shroud at the jet nozzle.

According to another form, the moving element is movably mounted on a wall of the inner structure.

The moving element is movably mounted between the inner structure and the jet nozzle in still another form of the present disclosure.

Advantageously, the moving element is made in several sectors and extends over at least part of the periphery of the ventilation outlet.

Alternatively, the moving element is made in a single sector that is at least partially peripheral.

Advantageously, the control means of the movable element comprise at least one electric driving means.

Alternatively, the control means of the moving element comprise at least one pneumatic or hydraulic driving means.

It should be noted that, in light of the temperature and pressure conditions near the turbojet engine, the presence of actuating and control means is made difficult.

Advantageously, the control means of the moving element comprise at least one driving means substantially at the ventilation pressure. In this way, it is possible to implement an at least partially automatic regulation of the pressure in the ventilation compartment.

In one form, the moving element is mounted against elastic return means toward its retracted position (maximum outlet cross-section) or engaged position (minimal outlet cross-section).

Further areas of applicability will become apparent from the description provided herein. It should be understood that the description and specific examples are intended for purposes of illustration only and are not intended to limit the scope of the present disclosure.

DRAWINGS

Figure 2:
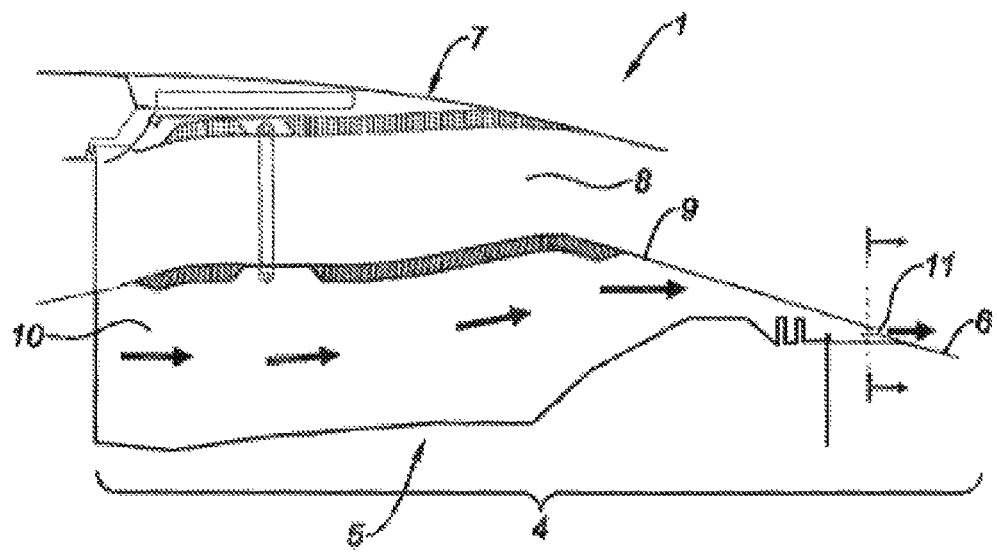
Figure 3:
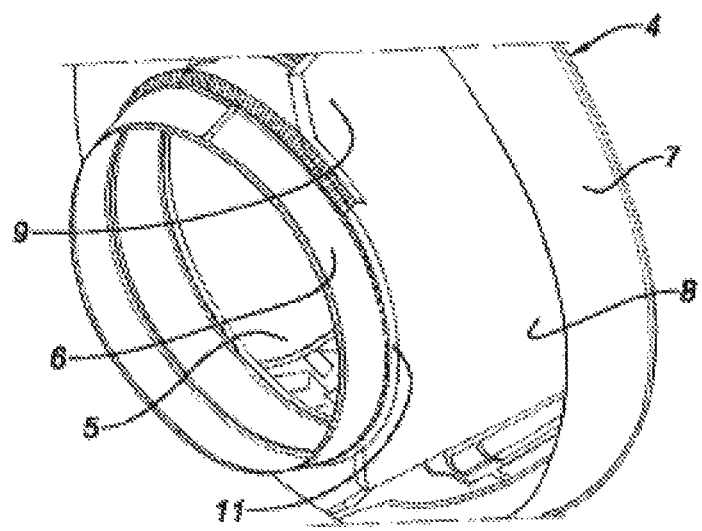
Figure 4:
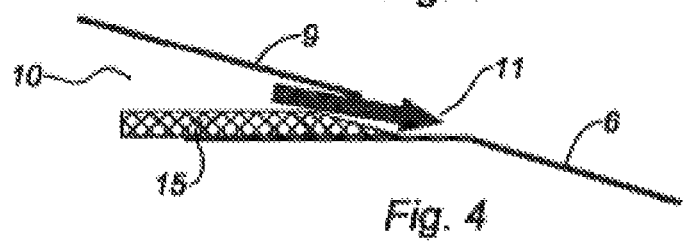
Figure 5:
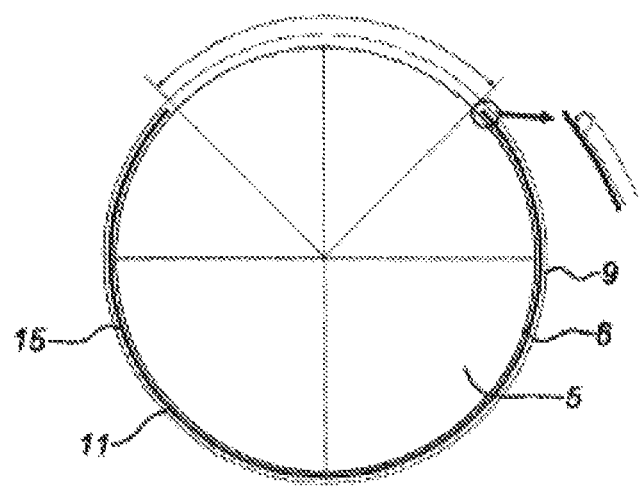

In order that the disclosure may be well understood, there will now be described various forms thereof, given by way of example, reference being made to the accompanying drawings, in which:

FIG. 1 is a diagrammatic longitudinal cross-sectional view of the nacelle according to the present disclosure in the closed state, FIG. 2 is a partial enlarged diagrammatic view of a rear section of the nacelle of FIG. 1, FIG. 3 is a partial diagrammatic perspective view from the rear of the nacelle of FIG. 1, FIG. 4 is a partial longitudinal cross-sectional view of a moving element equipping a ventilation outlet of the nacelle of FIG. 1 according to the present disclosure, FIG. 5 is a cross-sectional and partially enlarged detailed view of an outlet section and a rail/guideway system of a nacelle according to the teachings of the present disclosure, and FIGS. 6 to 13 are partial diagrammatic and longitudinal cross-sectional views of alternative forms of the moving element equipping a ventilation outlet of a nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A nacelle 1 of an aircraft according to the present disclosure, as diagrammatically shown in FIG. 1, comprises, in a known manner, a front air intake section 2, a middle section 3 designed to surround the fan (not visible), and a rear section 4 designed to surround an engine compartment 5 and ending with a jet nozzle 6 whereof the outlet is situated behind the turbojet engine.

This nacelle 1 comprises an outer structure 7, called OFS (Outer Fixed Structure), which defines an annular flow channel 8 with a concentric inner structure 9, called IFS (Inner Fixed Structure), surrounding a downstream part 5 of the turbojet engine behind the fan.

By way of illustration, it will be noted that the outer structure of the downstream section 4 shown is equipped with a thrust reverser device. Of course, this may also be a nacelle not equipped with a thrust reverser device, called a smooth structure.

The inner structure 9 defines a ventilation compartment 10 around the turbojet engine 5, allowing the circulation of a flow of cooling air (Arrows) around the turbojet engine by taking air from the tunnel 8.

The air taken is discharged from the ventilation compartment 10 through a ventilation outlet 11, delimited by a separation between the inner structure 9 and the jet nozzle 6 and maintained by separating means (not visible).

According to the present disclosure and like one form shown in FIGS. 4 and 5, the nacelle 1 comprises at least one moving element 15, associated with at least one corresponding control means (not visible), said moving element 15 being movable between a retracted position in which the ventilation outlet cross-section 11 is maximal, and an engaged position in which the moving element 15 at least partially reduces the ventilation outlet cross-section 11 relative to the retracted position, said control means being able to move the moving element 15 between the retracted and engaged positions.

The outlet cross-section 11 can therefore be actively and dynamically controlled to regulate the air pressure in the ventilation compartment 10 and to adapt to overpressure or pressure decrease cases.

The moving element can be designed to adopt one or more discrete positions between its retracted position and its engaged position, or to be moved continuously along a travel path.

As shown in FIG. 5, it should be noted that as a general rule, the outlet cross-section 11 does not extend over the entire periphery of the nozzle 6 and the inner structure 9, an upper portion being made sealable for fire packaging reasons.

The moving element 15 can be made in a single piece or several sectors, which may optionally be independent.

The shape of the moving element 15 may assume the desired form and may be adapted as a function of flow constraints in particular. It may in particular be incorporated into the enclosure of the structure 6, 9 on which it is mounted.

It is thus, for example, possible to provide a beveled moving element 15, 155, 158, 159, a moving element 151, 152 with a substantially rectangular cross-section, a rounded moving element 153, a pivoting flap 154, 156, etc.

According to one form, as shown in FIGS. 4, 6 to 9, the moving element 15, 151, 152, 153, 154 is movably mounted on an exhaust shroud at the jet nozzle 6.

Figure 10:
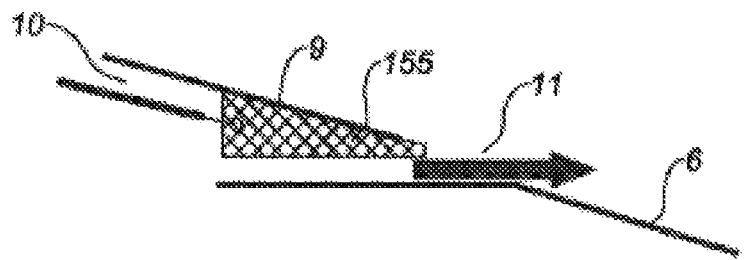
Figure 11:
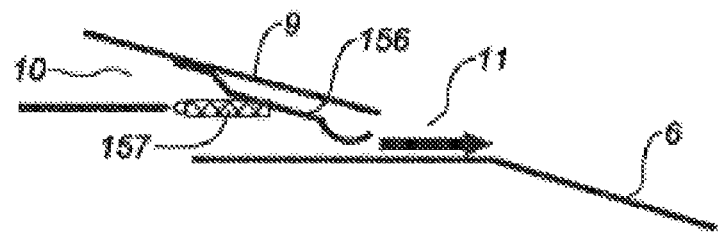
Figure 12:
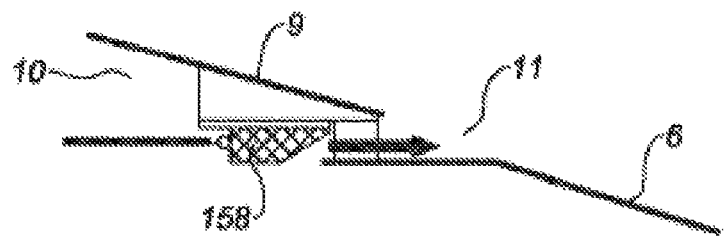

According to another from, as shown in FIGS. 10 to 12, the moving element 155, 156, 158 is movably mounted on the inner structure 9.

Figure 13:
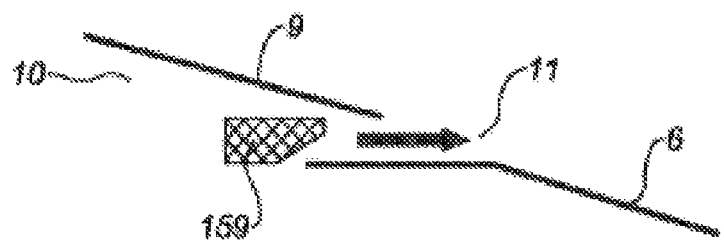

According to still another form, as shown in FIG. 13, the moving element 159 is movably mounted independently between the inner structure 9 and a shroud of the jet nozzle 6.

The movement of the moving element can also be of a different nature.

According to a first alternative form (FIGS. 4, 6, 7, 10, 12 and 13), the moving element 15, 151, 152, 155, 158, 158 is translatably mounted.

The guiding of the moving element may be done by means of a rail/guideway system, as shown in FIG. 5 (enlarged portion).

The moving element may be movable along a substantially longitudinal axis of the nacelle, but also along a radial axis of the nacelle or a combination of the two.

According to a second alternative form (FIGS. 9, 11), the moving element 154, 156 is rotatably mounted around a pivot axis like a check valve.

Of course, these forms are not limiting and equivalent means known by those skilled in the art can also be used.

The moving element 15 may be driven by any known actuating means, adapted to the surrounding temperature and pressure conditions.

It is in particular possible to provide electric, or pneumatic or hydraulic driving means.

Advantageously, the driving and/or control means will be offset from the moving element, in particular in a so-called cold zone, i.e., toward the upstream direction of the turbojet engine 5 and the ventilation compartment 10. In such a case, it is possible to provide driving by traction cable or rigid return such as a Cardan joint system.

Figure 6:
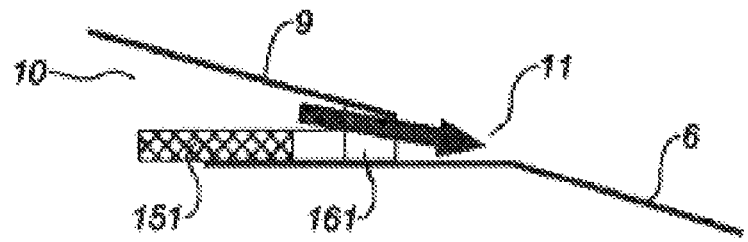
Figure 7:
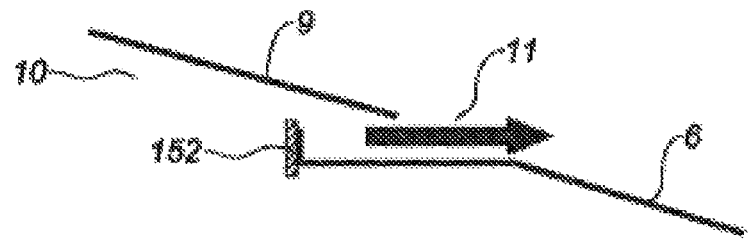

By way of complementary characteristics that may be generalized to the described forms, FIGS. 6 and 12 show the placement of local stops 161 positioned at the interface between the inner structure 9 and the nozzle shroud 6. The stops aim to make it possible to guarantee minimal separation between said inner structure 9 and the nozzle 6 in the case of relative deformation of the two structures 6, 9.

Figure 8:
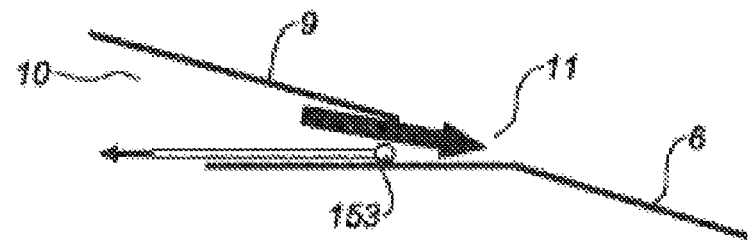
Figure 9:
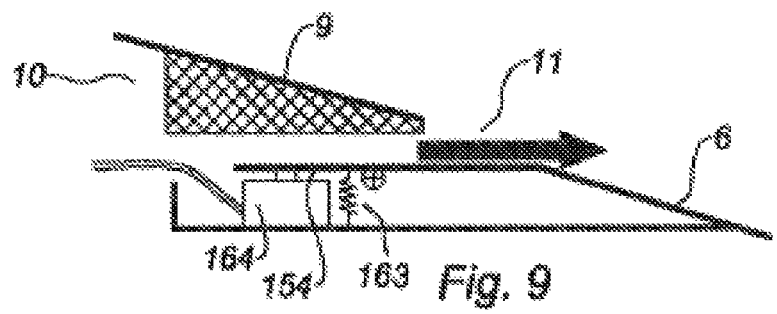

FIGS. 8 and 9 show forms using pressure-sensitive driving means in the ventilation compartment 10.

More specifically, FIG. 8 provides, as moving element 153, an inflatable element, like a bladder, which, by inflating, at least partially obstructs the ventilation outlet 11 more or less. One such type of system is particularly useful with control means of the pneumatic or hydraulic type. The pneumatic or hydraulic system may be associated with the engine or may be dedicated and autonomous. Furthermore, this inflatable element 153 can be elastic and tend to return automatically toward a default position, corresponding to a minimal or maximal outlet cross-section 11, in the event its supply pressure is released.

The aspect of FIG. 9 shows a moving element 154, made in the form of a pivoting flap, mounted against a return spring 163 tending to return it toward a retracted position in which the outlet section 11 is maximal. This flap is actuated by a mechanical retractable push-piece 164. This push-piece may be electric, hydraulic or pneumatic. The actuation of the flap may be done upstream or downstream of its axis of articulation. Furthermore, one push-piece can drive several flaps.

Likewise, FIG. 11 shows an elastic flap 156 (blade spring, for example) forced by a push-piece 157. The blade spring may have one end made up of several strips, for example formed by channels in the blade.

In FIG. 12, the moving element 158 is guided on the inner structure 9 following a rectilinear movement in the axis of the nacelle. Such a configuration makes it possible to design a single-piece structure of the moving element 158.

In FIG. 13, the moving element 159 is guided either on the inner structure IFS 9 or on the jet nozzle structure. The moving element 159, in its translation, reduces the passage section simultaneously between the two structures.

Furthermore, in the case of a so-called D-Duct nacelle structure, i.e., whereof the outer structure OFS comprises two semi-cylindrical half-cowls articulated in an upper area at an attachment mast, the moving element 158 can be made continuously from a sector covering the upper area without ventilation to the lower area of the inner structure 9.

In the case of a structure with a so-called O-duct downstream section 4, i.e., formed by a single substantially cylindrical sliding cowling, the moving element 158 may be formed by a sector connecting the two upper areas without ventilation.

Although the present disclosure has been described relative to specific example forms, it is of course in no way limited thereto and encompasses all technical equivalents of the described means, as well as combinations thereof if they are within the scope of the disclosure.

What is claimed is:

1. A turbojet engine nacelle comprising a rear section having an inner structure surrounding a rear part of an engine compartment and having a ventilation compartment, the inner structure configured to delimit, with a jet nozzle, a ventilation outlet cross-section of the ventilation compartment, wherein the turbojet engine nacelle comprises at least one moving element associated with at least one corresponding control device, said moving element being disposed within the ventilation compartment and movable between a retracted position in which the ventilation outlet cross-section is maximal, and an engaged position in which the moving element at least partially reduces the ventilation outlet cross-section relative to the retracted position, said control device comprising an actuator being operable to move the moving element between the retracted and engaged positions, and said moving element being biased in the retracted position by a biasing member, the actuator being spaced apart from the biasing member.

2. The nacelle according to claim 1, wherein the moving element can be moved into at least one intermediate position between its retracted and engaged positions.

3. The nacelle according to claim 2, wherein the moving element can be moved continuously between its retracted and engaged positions.

4. The nacelle according to claim 1, wherein the moving element is rotatably mounted around a pivot axis.

5. The nacelle according to claim 1, wherein the moving element is movably mounted on an exhaust shroud at the jet nozzle.

6. The nacelle according to claim 1, wherein the moving element is made in several sectors and extends over at least part of a periphery of the ventilation outlet cross-section.

7. The nacelle according to claim 1, wherein the moving element is made in a single sector that is at least partially peripheral.

8. The nacelle according to claim 1, wherein the actuator of the movable element comprises at least one electric driving device.

9. The nacelle according to claim 1, wherein the actuator of the moving element comprises at least one of a pneumatic and hydraulic driving device.

10. The nacelle according to claim 1, wherein the actuator is a push-piece and the biasing member is a return spring.

* * * * *